United States Patent
Seliger et al.

(10) Patent No.: US 9,925,489 B2
(45) Date of Patent: Mar. 27, 2018

(54) METHOD AND DEVICE FOR GENERATING FUEL FOR A GAS TURBINE

(71) Applicant: LINDE AKTIENGESELLSCHAFT, Munich (DE)

(72) Inventors: Andreas Seliger, Munich (DE); Alexander Brandl, Munich (DE)

(73) Assignee: Linde Aktiengesellschaft, Munich (DE)

( * ) Notice: Subject to any disclaimer, the term of this patent is extended or adjusted under 35 U.S.C. 154(b) by 357 days.

(21) Appl. No.: 14/760,591

(22) PCT Filed: Jan. 9, 2014

(86) PCT No.: PCT/EP2014/000030
§ 371 (c)(1),
(2) Date: Jul. 13, 2015

(87) PCT Pub. No.: WO2014/117911
PCT Pub. Date: Aug. 7, 2014

(65) Prior Publication Data
US 2015/0352483 A1    Dec. 10, 2015

(30) Foreign Application Priority Data
Jan. 31, 2013    (DE) .................. 10 2013 001 677

(51) Int. Cl.
*F02C 7/26*    (2006.01)
*B01D 53/14*    (2006.01)
(Continued)

(52) U.S. Cl.
CPC ..... *B01D 53/1475* (2013.01); *B01D 53/1425* (2013.01); *B01D 53/1462* (2013.01);
(Continued)

(58) Field of Classification Search
CPC ........ B01D 2252/2021; B01D 2256/16; B01D 2257/504; B01D 53/1418; B01D 53/1425;
(Continued)

(56) References Cited

U.S. PATENT DOCUMENTS 4,050,909 A * 9/1977 Ranke .................. C01B 3/506
                                                                                 95/161
4,425,317 A * 1/1984 Zeller ................ B01D 53/1462
                                                                                 423/226

(Continued)

FOREIGN PATENT DOCUMENTS

DE    10 2010 022501 A1    12/2011

OTHER PUBLICATIONS

Li Sun et al., "Rectisol wash process simulation and analysis", Journal of Cleaner Production, Jan. 1, 2013, pp. 321-328.

*Primary Examiner* — Jesse Bogue
(74) *Attorney, Agent, or Firm* — Philip H. Von Neida

(57) ABSTRACT

A method is provided for fractionating a feed gas containing hydrogen and carbon dioxide, from which feed gas carbon dioxide is largely selectively removed by scrubbing in a first gas scrubber using a sulphur-free scrubbing agent, wherein a scrubbing agent stream laden with carbon dioxide and co-absorbed hydrogen is obtained which is subsequently expanded in an expansion vessel in order to convert co-absorbed hydrogen into the gas phase. The characterizing feature of the method is that the hydrogen-containing gas phase is drawn off from the expansion vessel and admixed with a sulphur-free gas mixture containing hydrogen and carbon dioxide, which gas mixture arises in a second gas scrubber operated in parallel to the first as a product at a pressure which is lower than the pressure of the feed gas.

5 Claims, 1 Drawing Sheet

(51) Int. Cl.
*F02C 7/22* (2006.01)
*F02C 3/20* (2006.01)
*C01B 3/52* (2006.01)
*C10K 1/00* (2006.01)
*C10K 1/08* (2006.01)

(52) U.S. Cl.
CPC ............... *C01B 3/52* (2013.01); *C10K 1/004* (2013.01); *C10K 1/08* (2013.01); *F02C 3/20* (2013.01); *F02C 7/22* (2013.01); *B01D 53/1418* (2013.01); *B01D 2252/2021* (2013.01); *B01D 2256/16* (2013.01); *B01D 2257/504* (2013.01); *C01B 2203/025* (2013.01); *C01B 2203/0283* (2013.01); *C01B 2203/0415* (2013.01); *C01B 2203/0475* (2013.01); *C01B 2203/0485* (2013.01); *C01B 2203/1235* (2013.01); *C01B 2203/145* (2013.01); *C01B 2203/84* (2013.01); *Y02P 20/152* (2015.11)

(58) Field of Classification Search
CPC ............ B01D 53/1462; B01D 53/1475; C01B 2203/025; C01B 2203/0283; C01B 2203/0415; C01B 2203/0475; C01B 2203/0485
See application file for complete search history.

(56) References Cited

U.S. PATENT DOCUMENTS

| | | | | |
|---|---|---|---|---|
| 4,533,373 A | * | 8/1985 | Butz | B01D 53/1406 62/625 |
| 4,552,572 A | * | 11/1985 | Galstaun | B01D 53/14 95/161 |
| 4,568,364 A | * | 2/1986 | Galstaun | B01D 53/14 95/176 |
| 4,824,452 A | * | 4/1989 | Grunewald | B01D 53/1406 62/635 |
| 6,521,143 B1 | * | 2/2003 | Genkin | B01D 53/0476 252/373 |
| 8,591,626 B2 | * | 11/2013 | Brandi | B01D 53/1406 95/19 |
| 9,028,792 B2 | * | 5/2015 | Kerestecioglu | C01B 17/0408 423/578.1 |
| 9,216,375 B2 | * | 12/2015 | Brandl | B01D 53/1468 |
| 2010/0132553 A1 | | 6/2010 | Lechnick | |
| 2013/0025452 A1 | * | 1/2013 | Weiss | B01D 53/1425 95/266 |
| 2014/0190350 A1 | * | 7/2014 | Weiss | B01D 53/1406 95/186 |
| 2016/0258326 A1 | * | 9/2016 | Barchan | F01K 13/00 |

* cited by examiner

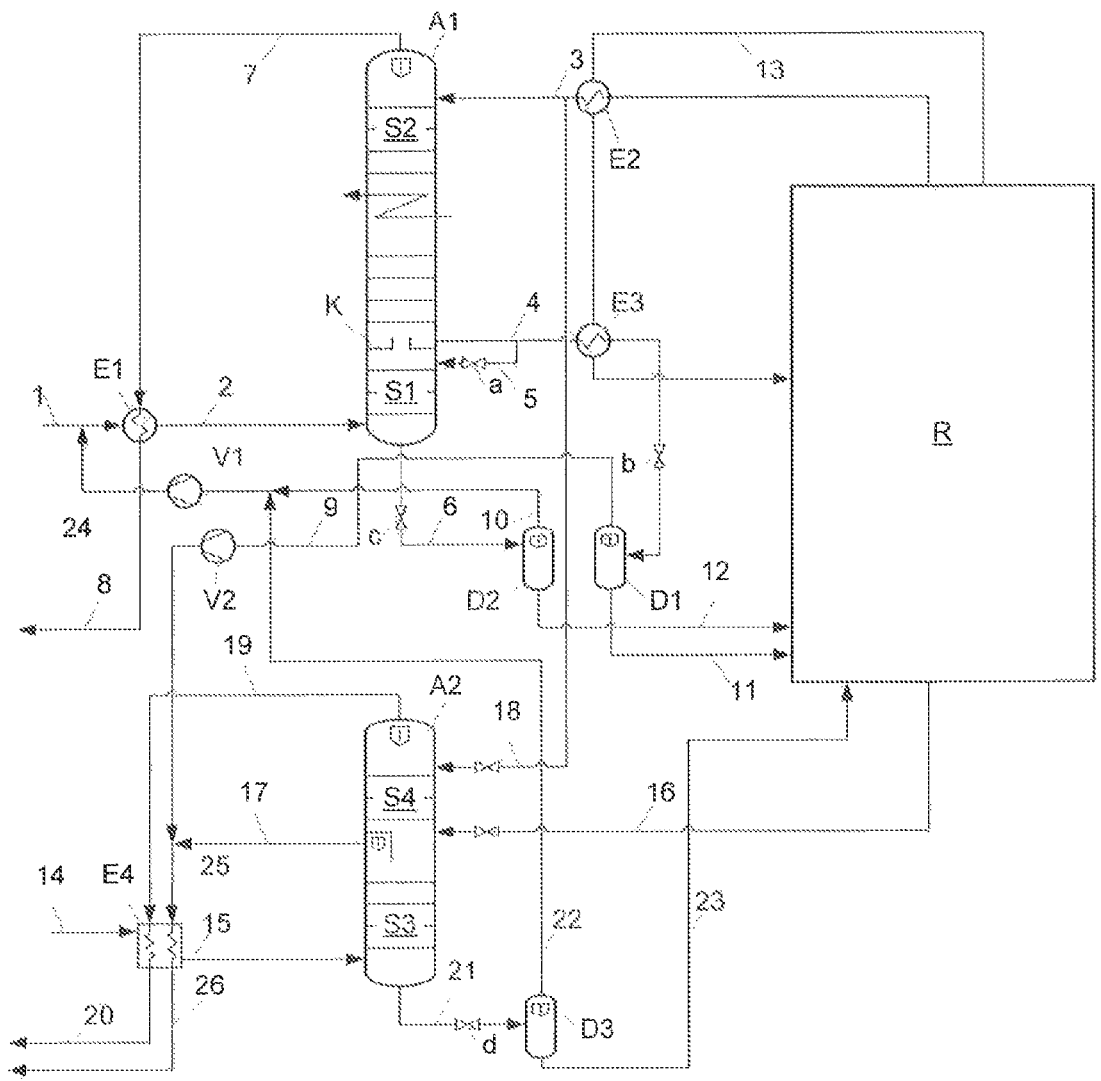

METHOD AND DEVICE FOR GENERATING FUEL FOR A GAS TURBINE

CROSS-REFERENCE TO RELATED APPLICATIONS

This application claims priority under 35 USC § 119 to International Patent Application No. PCT/EP2014/000030 filed in the European Patent Office on Jan. 9, 2014, which claims priority from German Patent Application 102013001677.0 filed on Jan. 31, 2013.

BACKGROUND OF THE INVENTION

The invention relates to a method for fractionating a feed gas containing hydrogen and carbon dioxide, from which feed gas carbon dioxide is largely selectively removed by scrubbing in a first gas scrubber using a sulphur-free scrubbing agent, wherein a scrubbing agent stream laden with carbon dioxide and co-absorbed hydrogen is obtained which is subsequently expanded in an expansion vessel in order to convert co-absorbed hydrogen into the gas phase.

Gas scrubbers are used in order to remove specific components from gas mixtures with the assistance of a liquid scrubbing agent in order thereby to produce a product gas. They exploit the characteristic of liquids of absorbing gaseous substances and keeping them chemically or physically bound in solution. The effectiveness with which a gas is absorbed by a liquid is expressed by the solubility coefficient: the better the gas dissolves in the liquid, the greater is its solubility coefficient. The solubility coefficient generally increases with failing temperature and rising pressure.

Subsequent to gas scrubbing, the scrubbed gas components are removed from the liquid used as the scrubbing agent, whereby the scrubbing agent is regenerated. While the scrubbed gas components are either discarded or put to economically viable use, the regenerated scrubbing agent is normally reused in the gas scrubber.

According to the prior art, hydrogen is obtained on a large industrial scale by converting feed materials containing carbon into a crude synthesis gas by gasification. Such a crude synthesis gas also contains, in addition to the wanted hydrogen, carbon monoxide and a series of other unwanted constituents, such as carbon dioxide ($CO_2$), hydrogen sulphide ($H_2S$) and carbonyl sulphide (COS). After at least partial conversion of the carbon monoxide with water to yield hydrogen and carbon dioxide, the crude synthesis gas is subjected to preferably physical gas scrubbing in order to separate the unwanted constituents. Such a method is appropriate for this purpose since crude synthesis gas is today generally produced at elevated pressure, and the efficiency of a physical gas scrubber increases in a first approximation linearly with the operating pressure. Methanol scrubbing, in which liquid methanol is used as the scrubbing agent at temperatures far below 0° C., is of particular significance for the purification of crude synthesis gases. "Gas Separation & Purification", December 1988, vol. 2, p. 171-176 describes a methanol scrubber in which carbon dioxide and sulphur components are selectively removed in two successive scrubbing steps from a crude synthesis gas containing hydrogen, carbon dioxide and $H_2S$ and COS. To this end, the crude synthesis gas is passed from the bottom upwards through an absorber column, in which a first and a second scrubbing section are arranged one above the other. The carbon dioxide is separated by using unladen methanol in the upper, second scrubbing section, while the sulphur components are removed in the first scrubbing section by scrubbing with a proportion of the methanol which has already been laden with carbon dioxide during separation of the carbon dioxide. Since the sulphur components have a solubility coefficient with regard to methanol which is a multiple higher than that of carbon dioxide, only a fraction of the quantity of scrubbing agent laden in the second scrubbing section with carbon dioxide is required to separate them.

Although hydrogen and carbon monoxide have a solubility coefficient with regard to methanol which is several orders of magnitude lower than carbon dioxide or the sulphur components present in the crude synthesis gas, small quantities of hydrogen and carbon monoxide are inevitably also dissolved by the methanol scrubbing agent during scrubbing of the crude synthesis gas. According to the prior art, in order to avoid any reduction in hydrogen or carbon monoxide yield as a result of this phenomenon, known as co-absorption, in a first regeneration step, the scrubbing agent streams laden with carbon dioxide or with carbon dioxide and sulphur components during gas scrubbing are, after prior chilling, in each case expanded in a separate expansion vessel to a pressure which is generally less than one third of the pressure at which the gas scrubbing is carried out. Under the temperature and pressure conditions prevailing in the expansion vessels, the co-absorbed substances are largely converted into the gas phase, while the unwanted components scrubbed from the crude synthesis gas largely remain dissolved in the scrubbing agent. The gas phases from the two expansion vessels which, in addition to hydrogen and carbon monoxide, also respectively contain carbon dioxide or carbon dioxide and sulphur components, are then compressed and recirculated into the crude synthesis gas to be fractionated upstream of the gas scrubber. While an elevated product yield is indeed achieved in this manner, the costs which in particular arise for the necessary compression of the gas phases to be recirculated do, however, have a negative impact on the economic viability of the method.

SUMMARY OF THE INVENTION

The object of the present invention is accordingly to configure a method of the above-described kind in such a manner that the disadvantages of the prior art are overcome.

The stated object is achieved according to the invention in that the hydrogen-containing gas phase is drawn off from the expansion vessel and admixed with a sulphur-free gas mixture containing hydrogen and carbon dioxide which arises in a second gas scrubber operated in parallel to the first as a product at a pressure which is lower than the pressure of the feed gas.

The method according to the invention is sensibly only used if the quality of the sulphur-free gas product containing hydrogen and carbon dioxide from the second gas scrubber is not significantly impaired, but is instead maintained or, in the most favourable case, even improved by admixing the hydrogen-containing gas phase. Under these conditions, the invention makes it possible to reduce the costs which arise for economically viable use of hydrogen-containing gas phase in comparison with the prior art. This is primarily attributable to the lower energy requirement during compression of the gas phase. Further economies are, however, also achieved in that the apparatus used for gas scrubbing may be of smaller dimensions due to the reduced volume of the gas stream to be scrubbed in the first gas scrubber.

The method according to the invention may particularly preferably be used if at least hydrogen and a fuel gas for a gas turbine are to be obtained from a crude synthesis gas containing hydrogen, carbon monoxide, carbon dioxide and sulphur components. In such a case, patent application DE19651282 proposes subdividing the crude synthesis gas into a first and a second sub-stream, wherein, after conversion or partial conversion by water-gas shift reaction, the first sub-stream is supplied to the first gas scrubber and has both sulphur and carbon dioxide removed from it, while the second sub-stream, is introduced directly into the second gas scrubber, in order to separate sulphur components largely selectively and to generate a product gas predominantly consisting of hydrogen, carbon monoxide and carbon dioxide. The unconverted gas typically has a pressure which is approx. 3 to 7 bar higher than that of the converted or partially converted synthesis gas. Both gas scrubbers may be operated using the same scrubbing agent, whereby it is also possible to make common use of a scrubbing agent regeneration unit.

Numerous liquids may be used as the scrubbing agent in the two gas scrubbers. Preferably, however, it is methanol, DMPEG, NMP, amines or amice-based scrubbing agents such as MEA, DEA, DIPA or mixtures formed from these substances which are used as the scrubbing agent.

One particularly preferred variant of the method according to the invention provides that sulphur components are largely selectively separated from the feed gas supplied to the second gas scrubber by a scrubbing agent preladen with carbon dioxide, wherein a scrubbing agent stream laden with sulphur components, carbon dioxide and co-absorbed hydrogen is obtained which is subsequently expanded in a further expansion vessel in order to convert co-absorbed hydrogen into the gas phase which is subsequently admixed with the feed gas for the first gas scrubber. The hydrogen-containing gas phase may optionally also entirely or in part be recirculated into the feed gas for the second gas scrubber.

BRIEF DESCRIPTION OF THE DRAWINGS

The invention will be explained in greater detail below with reference to an exemplary embodiment illustrated schematically in the FIGURE.

The FIGURE shows a methanol scrubber, in which a converted and an unconverted crude synthesis gas is fractionated in two gas scrubbers operated in parallel.

DETAILED DESCRIPTION OF THE INVENTION

Converted crude synthesis gas which, in addition to hydrogen, also contains carbon dioxide and sulphur components, is introduced into the heat exchanger E1 via line 1 and cooled therein against the process stream 7 to be preheated, before it may be fed via line 2 into a lower zone of the first scrubbing apparatus A1 which takes the form of an absorber column. The absorber column A1, which is typically operated at a pressure between 13 and 75 bar, comprises a lower scrubbing section S1 and an upper scrubbing section S2, which are separated from one another by a chimney tray K. The cold crude synthesis gas 2 is guided upwards in the absorber column A1 and as a result is brought into intimate contact with methanol scrubbing agent, which is supplied unladen via line 3 from the regeneration apparatus R and, after cooling against partially regenerated methanol scrubbing agent 13 in the heat exchanger E2, is introduced into the scrubbing section S2. Via the lines 4 and 5 and the control member a, methanol scrubbing agent already preladen with carbon dioxide from the chimney tray K is conveyed onwards into the scrubbing section S1, where it primarily absorbs sulphur components from the crude synthesis gas, before, laden with carbon dioxide and sulphur components, it is drawn off from the bottom chamber of the absorber column A1 and guided onwards via line 6. A gas 7 largely consisting of hydrogen may be drawn off from the top of the absorber column A1, which gas, after being preheated against the crude synthesis gas 1, is supplied as crude hydrogen 8 for example to a PSA (not shown) for further purification.

After cooling in the heat exchanger E3, the methanol stream 4 predominantly laden with carbon dioxide in the scrubbing section S2 is expanded via the constriction member b into the expansion vessel D1, while the methanol stream 6, which was laden in the two scrubbing sections S1 and S2 both with carbon dioxide and with sulphur components, passes via the constriction member c into the expansion vessel D2. Under the pressures prevailing in the expansion vessels D1 and D2, which correspond to approx. one third of the operating pressure prevailing in the absorber column A1, it is predominantly hydrogen and carbon monoxide, which were co-absorbed during scrubbing of the crude synthesis gas 2, which pass into the resultant gas phases which are drawn off via lines 9 and 10. The methanol streams 11 and 12 which are still laden with substances separated from the crude synthesis gas 2 are introduced into the regeneration apparatus R for further regeneration.

In order to obtain combustion fuel for a gas turbine, unconverted crude synthesis gas which, in addition to hydrogen and carbon monoxide, also contains carbon dioxide and sulphur components is introduced via line 14 into the heat exchanger E4 and cooled therein against process streams to be preheated, before it may be fed via line 15 into a lower zone of the scrubbing apparatus A2 which likewise takes the form of an absorber column. In the absorber column A2, which is typically operated at pressures of between 20 and 80 bar and which comprises a first scrubbing section S3 and a second scrubbing section S4, the cooled crude synthesis gas 15 flows upwards and as a result is brought into intimate contact with methanol scrubbing agent, which is supplied sulphur-free via the line 16 from the regeneration apparatus R and fed into the upper end of the scrubbing section 33. The sulphur-free methanol stream 16 is preladen with carbon dioxide and enters the scrubbing section S3 with a carbon dioxide partial pressure which is greater than the carbon dioxide partial pressure in the crude synthesis gas 15 to be scrubbed, from which the sulphur components, but no or only very little carbon dioxide, are therefore removed. A desulphurized gas mixture 17, which contains hydrogen and carbon monoxide and to a large part consists of carbon dioxide, may thus be drawn off via a side outlet. Some of the gas mixture desulphurized in the scrubbing section S3 is conveyed onwards into the scrubbing section S4, where the carbon dioxide is also removed by scrubbing with the unladen methanol 18 supplied at the top of the scrubbing column A2, such that a gas mixture 19 consisting of hydrogen and carbon monoxide may be guided out of the column A2 and, after preheating against the crude synthesis gas 14 to be cooled, be supplied as purified synthesis gas 20 for further use. In order to separate hydrogen and carbon monoxide co-absorbed during gas scrubbing, the laden scrubbing agent 21 is drawn off from the bottom of the absorber column A2 and expanded via the constriction member d into the expansion vessel D3, wherein a gas phase 22 predominantly consisting of hydrogen, carbon monoxide and carbon dioxide and methanol 23 laden with carbon dioxide and sulphur components are obtained. While the laden methanol 23 is introduced into the regeneration apparatus R, the gas phase 22 together with the gas phase 10 from the expansion vessel D2 is admixed with the converted crude synthesis gas 1 via the line 24 and the compressor V1. Both gas phases 10 and 22 may optionally entirely or in part also be introduced into the unconverted crude synthesis gas 14. The largely sulphur-free gas phase 9 containing hydrogen, carbon monoxide and carbon dioxide from the expansion vessel D1 is adjusted by the compressor V2 to the pressure of the desulphurized gas mixture 17 and combined with the latter to yield the gas stream 25 which, after preheating against the crude synthesis gas 14 to be cooled, is finally supplied to a gas turbine (not shown) as combustion fuel 26.

What we claim is:

1. A method for fractionating a first feed gas containing hydrogen and carbon dioxide, from which first feed gas carbon dioxide is selectively removed by scrubbing in a first gas scrubber with a sulphur-free scrubbing agent, wherein a scrubbing agent stream laden with carbon dioxide and co-absorbed hydrogen is thereby formed from the scrubbing in the first gas scrubber which is subsequently expanded in an expansion vessel in order to convert co-absorbed hydrogen into the gas phase, comprising a hydrogen-containing gas phase is drawn off from the expansion vessel and admixed with a sulphur-free gas mixture containing hydrogen and carbon dioxide which arises during the fractionation of a second feed gas in a second gas scrubber operated in parallel to the first gas scrubber as a product at a pressure which is lower than the pressure of the feed gas.

2. The method according to claim 1, characterized in that the gas mixture containing hydrogen and carbon dioxide produced as the product in the second gas scrubber is supplied as fuel gas to a gas turbine.

3. The method according to claim 1, characterized in that the feed gases containing hydrogen and carbon dioxide treated in the first and second gas scrubbers are obtained from a crude synthesis gas, which is divided into at least one first and one second sub-stream, wherein the first sub-stream is supplied after conversion by water-gas shift to the first gas scrubber, while the second sub-stream is introduced directly into the second gas scrubber.

4. The method according to claim 1, characterized in that the same scrubbing agent is used in the first and in the second gas scrubber.

5. The method according to claim 1, characterized in that, in the second gas scrubber, sulphur components are selectively separated from the feed gas by a scrubbing agent preladen with carbon dioxide, wherein a scrubbing agent stream laden with sulphur components, carbon dioxide and co-absorbed hydrogen is obtained which is subsequently expanded in a further expansion vessel in order to convert co-absorbed hydrogen into the gas phase, which is subsequently admixed with the feed gas for the first gas scrubber and/or the feed gas for the second gas scrubber.

* * * * *